(12) United States Patent
Gilmore et al.

(10) Patent No.: US 10,163,199 B2
(45) Date of Patent: Dec. 25, 2018

(54) RECIRCULATING AQUACULTURE SYSTEM AND TREATMENT METHOD FOR AQUATIC SPECIES

(71) Applicants: F&T Water Solutions LLC, Largo, FL (US); NaturalShrimp, Inc., Dallas, TX (US)

(72) Inventors: F. William Gilmore, Venice, FL (US); Ilia Petkov, Colorado Springs, CO (US); Michael Czarniecki, Cascade, CO (US); Gerald Easterling, Dallas, TX (US)

(73) Assignees: F&T WATER SOLUTIONS, L.L.C., Boca Raton, FL (US); NATURALSHRIMP, INC., Addison, TX (US)

( * ) Notice: Subject to any disclaimer, the term of this patent is extended or adjusted under 35 U.S.C. 154(b) by 43 days.

(21) Appl. No.: 15/362,805

(22) Filed: Nov. 28, 2016

(65) Prior Publication Data
US 2017/0150701 A1   Jun. 1, 2017

Related U.S. Application Data

(60) Provisional application No. 62/260,621, filed on Nov. 29, 2015.

(51) Int. Cl.
*G06T 7/00* (2017.01)
*C02F 1/28* (2006.01)
(Continued)

(52) U.S. Cl.
CPC ............ *G06T 7/0002* (2013.01); *A01G 22/00* (2018.02); *A01G 31/00* (2013.01); *A01G 33/00* (2013.01); *A01K 29/005* (2013.01); *A01K 61/80* (2017.01); *A01K 63/04* (2013.01); *A01K 63/042* (2013.01); *A01K 63/045* (2013.01); *C02F 1/001* (2013.01); *C02F 1/008* (2013.01); *C02F 1/283* (2013.01); *C02F 1/32* (2013.01); *C02F 1/4674* (2013.01);
(Continued)

(58) Field of Classification Search
CPC ...... G06T 7/0002; A01G 22/00; A01G 33/00; A01G 31/00; A01K 61/80; A01K 63/04; A01K 63/042; A01K 29/005; Y02P 60/642; Y02A 40/845; C02F 1/008; C02F 1/4674; C02F 1/001; C02F 1/32; C02F 1/78; C02F 1/283; C02F 2103/20; C02F 2101/16; C02F 2303/185; C02F 2209/11; C02F 2201/4614; C02F 2201/46135; C02F 2303/04
USPC ...... 210/143, 167.21, 167.22, 167.25, 167.3, 210/192, 748.17, 903; 119/227, 260
See application file for complete search history.

(56) References Cited

U.S. PATENT DOCUMENTS

5,076,209 A * 12/1991 Kobayashi ............. A01K 61/00
                                                              119/217
5,961,831 A * 10/1999 Lee ....................... A01K 63/042
                                                              119/204
(Continued)

*Primary Examiner* — Fred Prince
(74) *Attorney, Agent, or Firm* — Kyle W. Rost (57) ABSTRACT

A recirculating aquaculture system automatically controls ammonia, bacteria, solids, and feed quantity available to a captive species in a closed, water-based habitat. Functionally Independent processing loops operate in parallel on recirculating water streams, to control each of ammonia, bacteria, solids, and feed. The same or similar components, such as an electrolytic cell, may service one or more functional loops.

23 Claims, 6 Drawing Sheets

(51) Int. Cl.
  *C02F 1/32* (2006.01)
  *C02F 1/78* (2006.01)
  *A01K 63/04* (2006.01)
  *A01K 61/80* (2017.01)
  *C02F 1/00* (2006.01)
  *C02F 1/46* (2006.01)
  *A01G 22/00* (2018.01)
  *A01K 29/00* (2006.01)
  *A01G 33/00* (2006.01)
  *A01G 31/00* (2018.01)
  *C02F 1/467* (2006.01)
  *C02F 101/16* (2006.01)
  *C02F 103/20* (2006.01)

(52) U.S. Cl.
  CPC ............ *C02F 1/78* (2013.01); *C02F 2101/16* (2013.01); *C02F 2103/20* (2013.01); *C02F 2201/4614* (2013.01); *C02F 2201/46135* (2013.01); *C02F 2209/11* (2013.01); *C02F 2303/04* (2013.01); *C02F 2303/185* (2013.01); *Y02A 40/845* (2018.01); *Y02P 60/642* (2015.11)

(56) References Cited

U.S. PATENT DOCUMENTS

| | | | | |
|---|---|---|---|---|
| 6,447,681 | B1* | 9/2002 | Carlberg | A01K 63/04 119/227 |
| 6,830,681 | B2* | 12/2004 | Henkemans | A01K 63/04 119/260 |
| 2003/0213745 | A1* | 11/2003 | Haerther | C02F 3/32 210/602 |
| 2005/0109697 | A1* | 5/2005 | Olivier | C02F 3/00 210/610 |
| 2008/0314811 | A1* | 12/2008 | Smith | A01K 63/04 210/167.21 |
| 2009/0152192 | A1* | 6/2009 | Michaels, II | A01K 63/04 210/605 |
| 2011/0039321 | A1* | 2/2011 | Tal | C02F 3/2806 435/167 |
| 2013/0112601 | A1* | 5/2013 | Silver | C02F 3/025 210/143 |
| 2013/0247832 | A1* | 9/2013 | Holder | C02F 3/104 119/260 |
| 2015/0196002 | A1* | 7/2015 | Friesth | A01G 22/00 47/62 R |

* cited by examiner

RECIRCULATING AQUACULTURE SYSTEM AND TREATMENT METHOD FOR AQUATIC SPECIES

BACKGROUND OF THE INVENTION

Field of the Invention

The invention generally relates to animal husbandry and more specifically to aquatic animal culturing. An aspect of the invention relates to crustacean culturing including the care and propagation of lobster, shrimp, or other aquatic arthropods that have a chitinous or calcareous exoskeleton. The invention may provide a habitat with recirculation and filter means. Another aspect of the invention relates to the care and propagation of fish. A further aspect of the invention relates to mollusk culturing, including the propagation and care of oyster, clam, or other aquatic animals with a soft, unsegmented body enclosed in a calcareous shell.

The invention also relates to culturing aquatic plants.

This invention is directed to the field of aquaculture for implementation of a different and unique system and method for treating aquatic species such as fish, crustaceans, mollusks, and aquatic plants. The system and method is known as a recirculating aquaculture system (RAS).

Description of Related Art

Aquaculture is the breeding, rearing, and harvesting of a captive aquatic species in various types of water environments. The captive aquatic species generates waste products that require removal during their growth process. Without removal, ammonia, bacteria, and solids quickly accumulate and overtake the system, significantly reducing survival of the aquatic species through harvest. The treatment method depends on the type of system deployed. Most aquaculture systems depend on an "open" flow method to remove the waste products by exchanging water between the aquaculture system and the surrounding environment. However, the "open" flow method can have a dramatically harmful effect on the local environment.

A small percentage of aquaculture systems utilize a "closed" flow method (also known as a recirculating aquaculture system or RAS) that recirculates the water within the system, thereby preventing contamination of the surrounding environment. However, this approach requires more sophisticated treatment methods.

The present invention employs an improved method for RAS treatment by combining several technologies to control the excessive accumulation of ammonia, bacteria, and solids within the system. The invention employs multiple control loops that can be functionally distinct. For example, it is desirable to employ an ammonia control loop, a bacteria control loop, a solids control loop, and a feeding control loop. In one or more of these loops, electrolytic treatment is adapted to achieve the function of the loop. A single electrolytic processor can be shared among loops to efficiently process various streams within the recirculating aquaculture system.

To achieve the foregoing and other objects and in accordance with the purpose of the present invention, as embodied and broadly described herein, the method and apparatus of this invention may comprise the following.

BRIEF SUMMARY OF THE INVENTION

Against the described background, it is therefore a general object of the invention to provide a recirculating aquaculture system that automatically controls ammonia, bacteria, solids, and feed quantity.

Another object is to control ammonia, bacteria, solids, and feed by independently operating means that function in parallel.

According to the invention, a closed recirculating aquaculture system treats an aqueous stream supporting a selected, contained aquatic species. The aquaculture system operates with a containment providing habitat for the selected aquatic species. A plurality of functional control loops operate in parallel and communicate with the containment to recirculate and treat the aqueous stream. One of the functional control loops is an ammonia control loop providing a chlorine production system. Another of the functional control loops is a bacteria control loop providing a suppression chamber operating a bacteria suppressing means, and a suppression controller adjusting operation of the bacteria suppressing means at the suppression chamber. A further functional control loop is a solids control loop providing an image processor and a solids filter, wherein the image processor is applied to the aqueous stream to determine turbidity and regulates flow through the solids filter in response to detected turbidity. Still another functional control loop is a feeding control loop that operates feeding controls selected from either an audible behavior monitor or a visual population monitor applied to the aqueous stream to monitor and control a supply of feed for the aqueous species.

Several of the control loops might employ the same or similar components, such as an electrolytic cell or processing chamber, an image processor, a controller, or a filter. The same physical component might perform its function in more than one functional loop. For example, the chlorine production system and the bacteria suppressing means might employ the same electrolytic cell or equivalent electrolytic processing chamber. For use in the ammonia control loop, an electrolytic cell contains at least a set of reaction plates suited to generate chlorine gas in response to a current applied between plates of the set, wherein the electrolytic cell applies a current between plates of the set, thereby generating chlorine gas. A cell controller is adapted to detect ammonia level in the aqueous stream and to vary parameters of operation for the electrolytic cell, where the operating parameters are selected from voltage and current, and wherein the cell controller varies the operating parameters of the electrolytic cell in response to detected changes in ammonia level in the aqueous stream. Alternatively, the electrolytic cell is adapted to detect ammonia level in the aqueous stream and in response to vary flow rate through the electrolytic cell. In the bacteria control loop, the bacteria treatment chamber may be the same or separate electrolytic cell or processing chamber.

In the feeding control loop, the audible behavior monitor can be a feeding controller equipped with a hydrophone that monitors the sound behavior of the aquatic species during feeding. From these sounds, it is possible to derive the need for feeding and to control the supply of feed from a feed dispenser. Alternatively, a visual population monitor can operate an image processor that determines size of population and, in turn, enables determination of corresponding weight. Together, population size and weight are suitable to control operation of a feed dispenser.

According to a further aspect of the invention, an improved method is used to treat captive aquatic species in a recirculating aquaculture system to control excessive accumulation of ammonia, bacteria, and solids within the system. The aquaculture system is established by providing a closed, water-based habitat containing the selected aquatic species.

An aqueous stream from the habitat is treated by recirculating the stream through a plurality of functional control loops operating in parallel.

One of the control loops may be called an ammonia control loop, which initially treats the aqueous stream by generating chlorine to convert ammonia into chloramine compounds and free chlorine. This control loop further treats the aqueous stream by then removing chloramine compounds and free chlorine.

Another of the control loops may be called a bacteria control loop, which routes the aqueous stream through a bacteria suppression chamber, where a bacteria suppressing means is applied to the aqueous stream within the chamber.

Still another of the control loops may be called a solids control loop, where a controller communicating with an image processor determines turbidity of the aqueous stream and regulates flow of the aqueous stream through a solids filter in response to the degree of determined turbidity.

A further control loop may be called a feeding control loop, which monitors the aqueous species by means selected from an audible and a visual monitor. The selected monitor communicates with a feeding controller that determines feeding needs from the data gathered by the selected monitor. The feeding controller also communicates with a feed dispenser and causes the dispenser to supply feed according to determined need.

It would be desirable to have a recirculating aquaculture system that operates with improved automation and accuracy. The invention provides functionally independent control loops that operate in parallel to effectively control ammonia, bacteria, solids, and feeding within an aqueous stream of a recirculating aquaculture system.

The accompanying drawings, which are incorporated in and form a part of the specification, illustrate preferred embodiments of the present invention, and together with the description, serve to explain the principles of the invention. In the drawings:

DETAILED DESCRIPTION OF THE INVENTION

Figure 1:
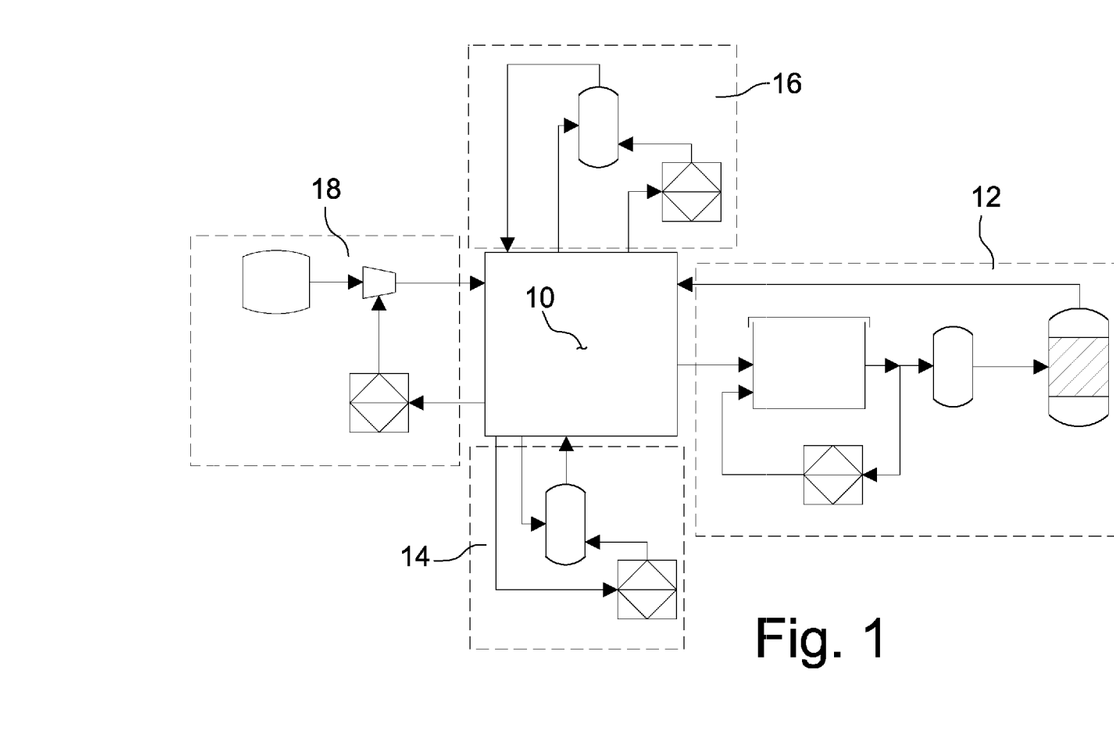
FIG. 1 is a schematic view of an aquaculture system for RAS treatment of a captive species.

With reference to FIG. 1 of the drawings, the invention is an apparatus and method for treating aquatic species in a closed aquaculture system by the method known as a recirculating aquaculture system or RAS. An aquaculture tank 10 illustrates a representative, water-based habitat for the species but is not a limitation as to the type of containment to be used for practice of the invention. Therefore, it will be understood that references to tank 10 are for convenience of description, without excluding other types of containment.

Methods employing a recirculating aquaculture system or RAS to treat a recirculating water stream from tank 10 are illustrated by representative control loops 12, 14, 16, and 18. For clarity, each control loop will be described as functioning independently of the others and being distinct in function and components. The four independent control loops operate in parallel to effectively control ammonia, bacteria, solids, and feeding within a RAS. Consequently, the four functionally distinct loops are the ammonia control loop 12, the bacteria control loop 14, the solids control loop 16, and the feeding control loop 18.

When structured and operated independently, each loop can be optimized as it pertains to the specific aquatic species. For example, shrimp feed size, composition, and solubility differs from fish feed size, composition, and solubility. Both aquatic species (shrimp and fish) would utilize the four functionally distinct loops to control ammonia, bacteria, solids, and feeding. However, the difference in feed type used when feeding each aquatic species could cause different ammonia percentages, different bacteria counts, different solids amounts and types, and require different feeding delivery systems. Consequently, these differences resulting from different feed types would require optimization of each loop as it pertains to shrimp or fish but could also apply to other types of aquatic species.

Figure 2:
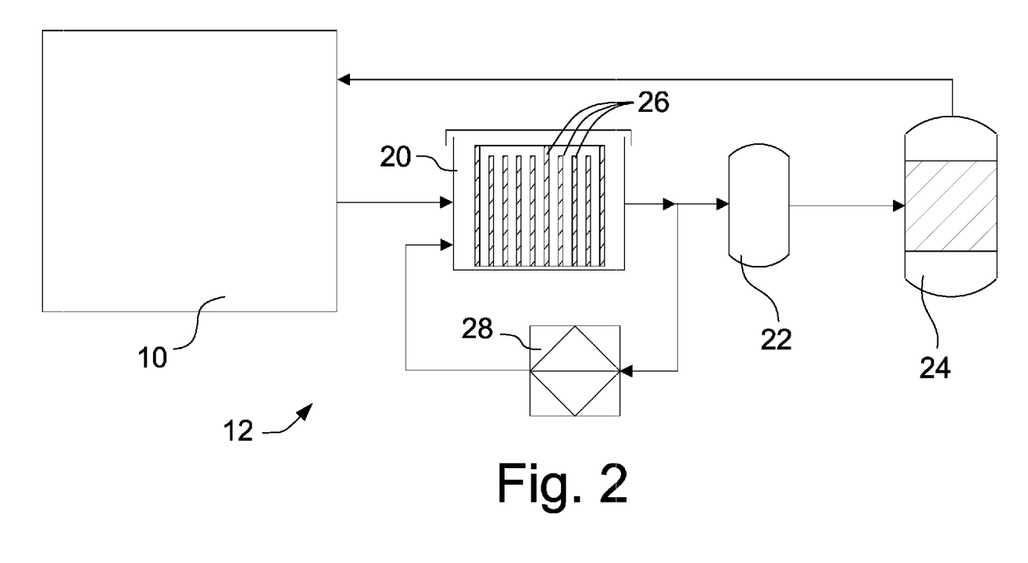
FIG. 2 is a detailed schematic view of an ammonia control loop of the aquaculture system of FIG. 1.

With reference to FIG. 2, one byproduct of feed used in aquaculture systems is the production of ammonia. Ammonia is very toxic and must be removed from an aquaculture system on a continual basis to avoid harm to the animals under culture. Traditional non-recirculating aquaculture systems, such as ponds established in or by the ocean, remove the ammonia by continually discharging wastewater into the local environment. A traditional RAS does not discharge the wastewater into the environment and normally uses a biofilter to remove the ammonia.

A biofilter contains mainly two types of bacteria that can convert the ammonia under aerobic conditions first to nitrite (still toxic) and then to nitrate (not as toxic). A biofilter effectively removes the ammonia from the system (except for high density systems) but allows an increase in the nitrate levels. Therefore, a typical RAS also utilizes a de-nitrification process using another type of bacteria under anaerobic conditions to convert the excess nitrate to non-toxic nitrogen gas.

According to the portion of the invention as illustrated in FIG. 2, a representative ammonia control loop 12 employs a combination of a chlorine production system such as accomplished with an ozone system or a liquid chlorine drip system or an electrolytic system or chamber 20, which is similar to an electrocoagulation chamber; plus a mechanical filter 22, and an activated carbon filter 24 to effectively remove ammonia from an aquaculture system such as tank 10. This method eliminates the need for a biofilter and consequently prevents the conversion of ammonia to nitrite and subsequently to nitrate. Therefore, the ammonia control loop 12 also eliminates the need for de-nitrification to remove excess nitrate from the system.

Electrolysis used for this purpose involves the use of reaction chambers 20 that contain both active and passive electrically driven plates 26. A water stream from tank 10 is circulated through the ammonia control loop, where it is processed between the plates 26. Interaction between the water stream and the plates 26 produces chlorine. At a proper voltage, current, and flow rate, the chlorine combines with the ammonia present in the water stream to form chloramine compounds. A controller 28 regulates operating parameters of the electrolysis chamber and may include sensors detecting characteristics of the water stream in order to adjust the operating parameters automatically.

Activated carbon filters 24 located downstream from the electrolytic reaction chambers 20 absorb the chloramine compounds and excess free chlorine from the water stream. Mechanical filters 22 placed in-line before the activated carbon filters 24 protect against solids entering the activated carbon filters 24. A related benefit of this method is the reduction of potentially harmful bacteria from the system because bacteria passing through the electrolytic process are reduced.

While an electrolytic device is used in the ammonia control loop and optionally elsewhere in a recirculating aquaculture system, the setup, operation and products of the device can be unique, as described below. Such a device 20 and its controller 28 include a power supply for applying a potential across the plates 26. The reaction chamber can be configured to be self-cleaning and to operate in a non-pressured realm. The number of plates is variable, and the plates may be variably connected to operate as active or passive plates. For different applications or different aquatic species, the plate material may be chosen from among different materials, with carbon plates being preferred for producing the desired reaction product. Electronic controls can vary voltage and current, which are varied as ammonia level changes. Similarly, flow rate is varied inversely to ammonia level changes. Sensors and alarms can be applied to all parameters and to alert an operator to situations requiring attention.

The mechanical filter 22 is variable in its structure, depending upon the aquatic species. Typical selections are of appropriate filter media. Choices include a micro screen filter media, a disc filter media, or granular media.

The activated carbon filter 24 may employ different types of carbon. The filter can be structured to accommodate different backwashing methods. Appropriate pressure gauges, chlorine sensors and alarms are typical components of the activated carbon filter.

A recirculating aquaculture system contains naturally occurring bacteria that actually benefit the health of an aquatic species. However, bacteria levels within a recirculating aquaculture system can increase rapidly and quickly become out of control. Given the right conditions, bacteria can use the environment often found within a recirculating aquaculture system to multiply exponentially and subsequently cause harm to the aquatic species. The typical approach to dealing with this issue is the use of antibiotics, which may pose a risk to human health.

Figure 3:
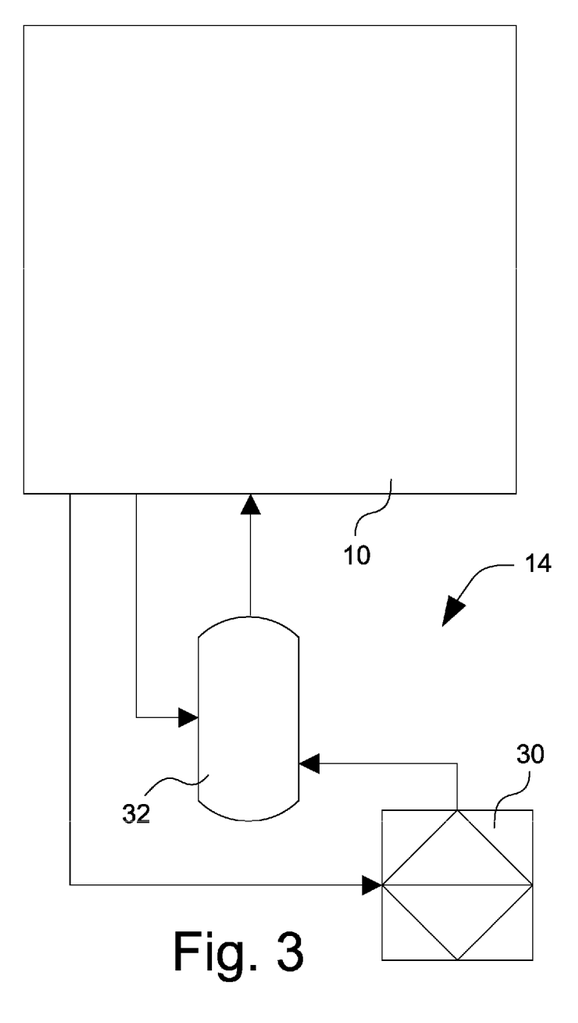
FIG. 3 is a detailed schematic view of a bacteria control loop of the aquaculture system of FIG. 1.

According to the portion of the invention illustrated in FIG. 3, a representative bacteria control loop 14 automatically suppresses bacteria in the recirculating water stream from tank 10 by processing the water stream in bacteria treatment chamber 32. This configuration of loop 14 and the method of controlling bacteria is variable for each given aquatic species. A controller 30 accommodates differences by measuring water quality parameters that correlate to the amount of bacteria present in the water. The controller 30 then adjusts the amount of bacteria suppression at chamber 32 to keep the bacteria colony at a safe and normal level.

Bacteria treatment chamber 32 may employ any of several technologies to achieve control, with the preferred choice of treatment being a function of the aquatic species in tank 10. The method of treatment may employ an ozone generator, an ultraviolet lamp, or electrolytic processing. Treatment chamber 32 may be an electrolytic processing chamber as more fully described in connection with FIG. 6.

The feed eaten by the aquatic species within a recirculating aquaculture system decomposes into a waste product referred to as solids that remain with the water column and that can quickly foul the water by generating additional ammonia. A traditional recirculating aquaculture system uses a variety of methods to remove solids such as settling basins, tube/plate separators, swirl separators, micro screen filters, and granular media filters.

Figure 4:
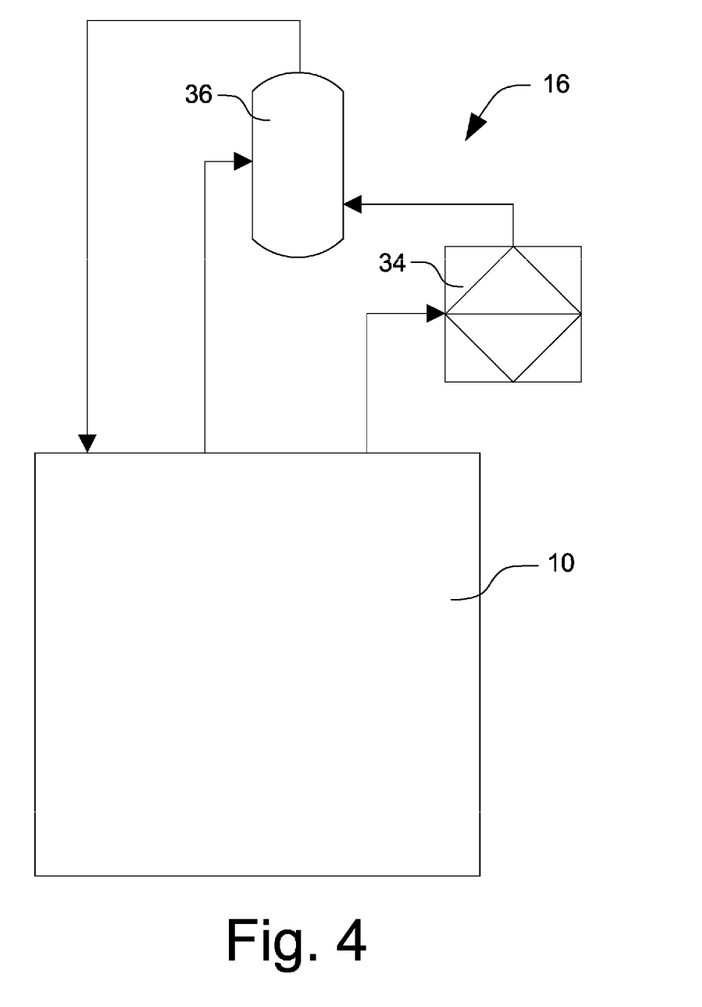
FIG. 4 is a detailed schematic view of a solids control loop of the aquaculture system of FIG. 1.

According to the portion of the invention illustrated in FIG. 4, a representative solids control loop 16 automatically removes solids from the recirculating water stream. The configuration and operation of the solids control loop is a function of the given aquatic species in tank 10. A controller 34 is equipped with image processing means applied to the water stream. An image processor is utilized to determine the turbidity of the water to regulate the flow through a mechanical filter 36. In greater detail, the mechanical filter 36 can be selected from drum filters, cartridge filters, foam fractionators, and the like.

Proper feeding of a recirculating aquaculture system is essential for the other treatment control loops to operate optimally. Underfeeding slows growth and encourages cannibalism. Overfeeding wastes feed and unnecessarily increases the ammonia, the bacteria, and the solids within a recirculating aquaculture system and directly impacts those treatment control loops. The amount and type of feed required for a recirculating aquaculture system depends not only on the type of aquatic species but also their population and their average weight at the time of feeding. Typical recirculating aquaculture systems rely on estimation of aquatic species population by using manual techniques such as feed trays or net captures and estimation of aquatic species average weight by manually taking weight samples.

Figure 5:
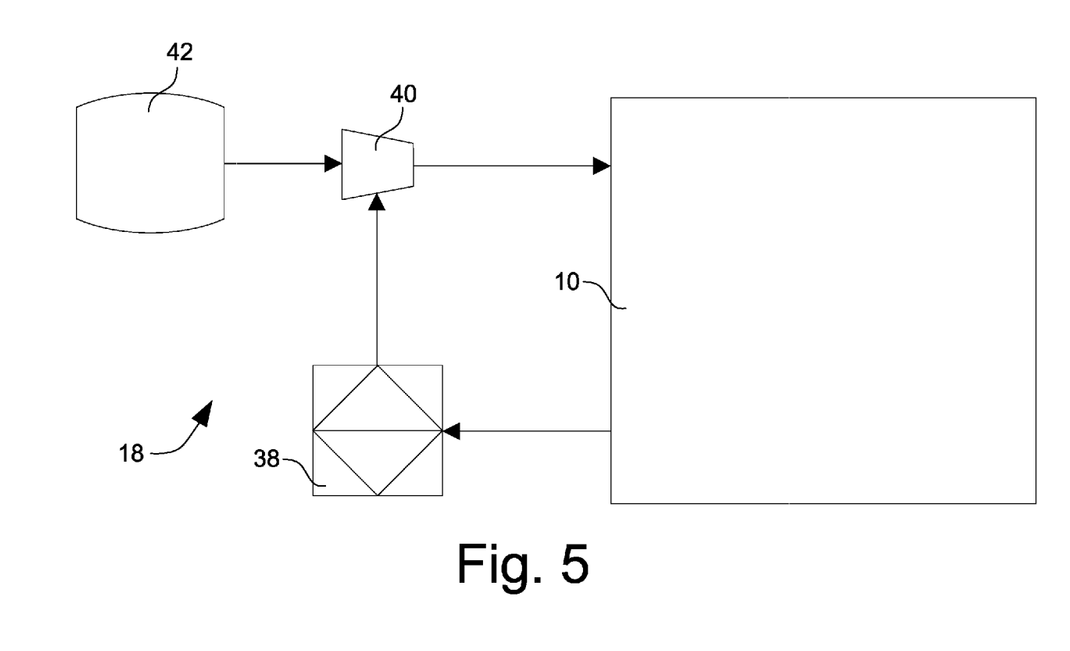
FIG. 5 is a detailed schematic view of a feeding control loop of the aquaculture system of FIG. 1.

According to the portion of the invention illustrated in FIG. 5, a representative feeding control loop 18 that automatically controls feeding by either monitoring aquatic species behavior or by estimating population and average weight for a given aquatic species. When feeding based on behavior, a feeding controller 38 is equipped with a hydrophone that monitors the sound that the aquatic species makes during feeding and uses that information to distribute feed only as the sounds made by the aquatic species indicate the need for feeding. When feeding based on population and weight estimating, a feeding controller 38 is equipped with image processing means applied to the tank 10 or water stream through loop 18. The image processor is utilized to determine a population estimate. Weight is directly related to size. Therefore, image processing can also deduce the average weight from a relationship table after determining the average size. An image processor reduces labor and also increases the accuracy of the estimations as compared to prior techniques. The feeding controller 38 also interfaces with a feed dispenser 40 that receives feed from a feed supply 42 and automatically dispenses the proper amount and type of feed, as needed.

Several different types of controller 38 are suitable choices for use in this recirculating aquaculture system. The controller is selected from the group consisting of a YSI controller, a PLC controller, a custom controller that uses video or ultrasonics for imaging, or an image processing device. The preferred choice of controller is a function of the selected species in tank 10.

Figure 6:
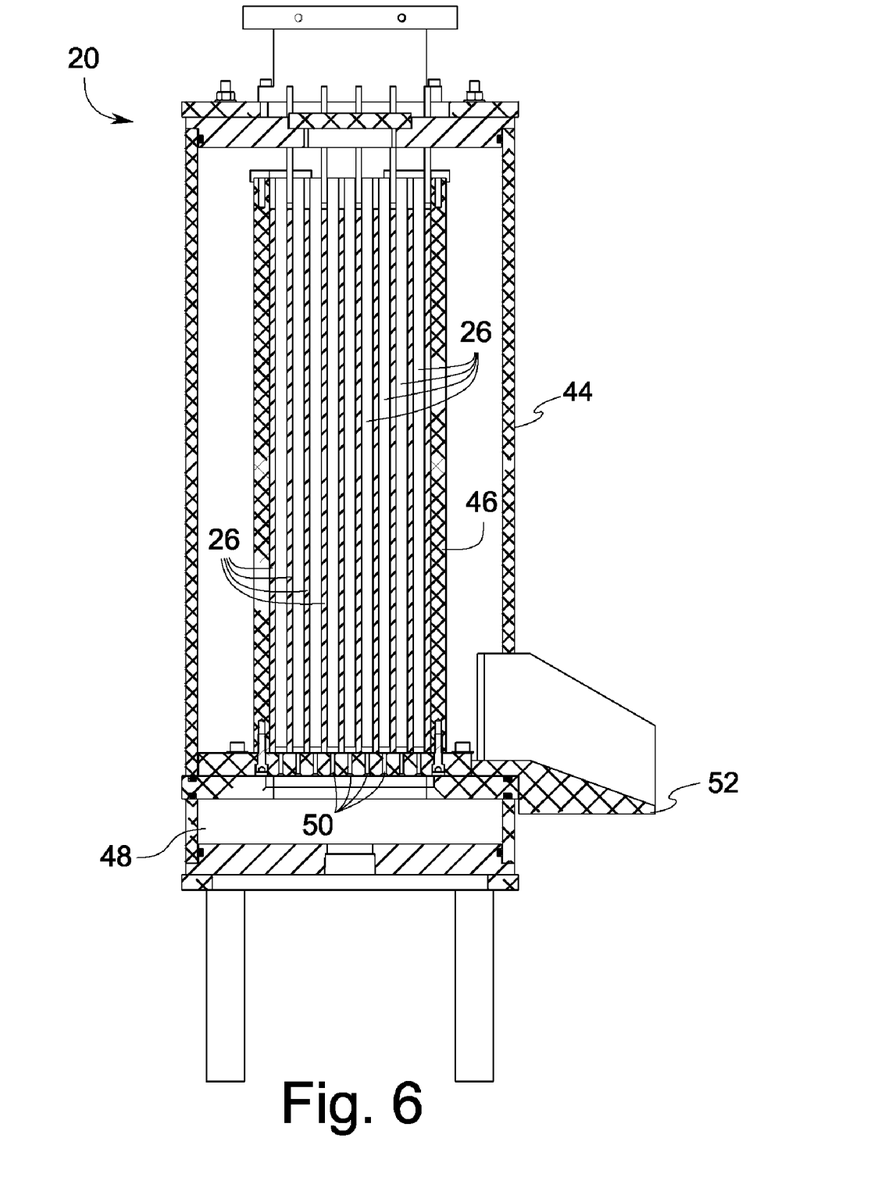
FIG. 6 is a vertical cross-sectional view of an electrolytic processing chamber of the recirculating aquaculture system.

The feed dispenser 40 operates to deliver a predetermined quantity of feed to tank 10. Thus, among other characteristics, the feed dispenser is chosen for the ability to meter the quantity of feed that is delivered. Suitable choices are selected from air operated dispensers, conveyor belt dispensers, and the like.

Where the use of an electrolytic processing chamber 20 is discussed, above, an effective system is uniquely configured to support the requirements of aquaculture. As best seen in FIG. 6, the electrolytic chamber 20 is formed of an outer housing 44 that contains an inner reaction cell 46 consisting of at least one set of spaced electrode plates 26. A set of plates consists of a negatively charged electrode or cathode and a positively charged electrode or anode. A reaction cell may contain many plates and sets of plates.

A pump supplies a feed stream from tank 10 to pressure vessel 48 under elevated pressure. The pressure vessel 48 is located below the reaction cell 46 and maintains the contents of the vessel at above-atmospheric pressure. Feed ports 50 between the pressure vessel and reaction cell 46 pass a metered feed stream into the reaction cell from the pressure vessel. In the reaction cell, the stream flows up between the electrode plates, where the stream is treated electrolytically at atmospheric pressure.

The feed stream rises in the reaction cell 46 until the treated stream reaches the top, where the treated stream overflows the top edge of reaction cell 46. The outer housing 44 is wider than the reaction cell and defines a peripheral space around the outer side of the reaction cell. This space or gap receives the overflowing treated stream from the reaction cell 46. The overflowing liquid washes any foam or other reside from the top of the reaction cell and carries it into the peripheral gap. An outlet chute 52 or other discharge means removes the processed feed stream from the gap of housing 44.

When a DC current is applied across the plates of a set that is immersed in an electrolyte solution such as saltwater, the cathode attracts positive ions and reduces them, while the anode attracts negative ions and oxidizes them. Ion exchange takes place at the solution interface between each plate and an attracted ion, producing an accumulation of the gathered element. In particular, electrolysis of saltwater brings chloride ions to the anode where they form chlorine gas. This product both dissolves in the water and vents to air. The dissolved chlorine gas reacts with nitrogen compounds in the water, such as with ammonia.

In order to remove ammonia from the feed stream, the configuration of the reaction cell is preferred to employ carbon electrodes 26 rather than conventional metal electrodes. When DC current is applied to a carbon electrode in a saltwater environment, the generated chlorine removes ammonia from the treated stream, which is the desired result in this application. The carbon electrode does not sacrifice significant ions into the treated feed stream, with the added result that there is no coagulation.

Products of the electrolytic reaction are strong disinfectants that remove bacteria and viruses, thus sterilizing the treated water stream. Species such as hypochlorous acid and various oxides are effective for this purpose.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention.

What is claimed is:

1. A recirculating aquaculture system for treating an aqueous stream supporting a contained aquatic species, comprising:
   a containment providing habitat for a selected aquatic species;
   a plurality of functional control loops operating in parallel and communicating with said containment to recirculate and treat an aqueous stream;
   wherein the functional control loops comprise:
   an ammonia control loop;
   a bacteria control loop;
   a solids control loop; and
   a feeding control loop.

2. The recirculating aquaculture system of claim 1, wherein said ammonia control loop comprises:
   a chlorine production system introducing chlorine gas into the ammonia control loop;
   a mechanical filter located in a downstream position relative to said chlorine production system, removing solids from said aqueous stream; and
   an activated carbon filter located in a downstream position relative to said chlorine production system, absorbing chloramine compounds and free chlorine from the aqueous stream.

3. The recirculating aquaculture system of claim 2, wherein said chlorine production system is chosen from an ozone system and a liquid chlorine drip system.

4. The recirculating aquaculture system of claim 2, wherein said chlorine production system comprises:
   an electrolytic cell containing at least a set of reaction plates generating chlorine gas in response to a current applied between plates of said set, wherein said electrolytic cell applies a current between plates of the set, thereby generating chlorine gas; and
   a cell controller for said electrolytic cell, detecting ammonia level in said aqueous stream and varying operating parameters of the electrolytic cell, wherein said operating parameters are selected from voltage and current, and wherein said cell controller varies the operating parameters of the electrolytic cell in response to detected changes in ammonia level in the aqueous stream.

5. The recirculating aquaculture system of claim 2, wherein said chlorine production system comprises:
   an electrolytic cell containing at least a set of reaction plates generating chlorine gas in response to a current applied between plates of said set, wherein said electrolytic cell applies a current between plates of the set, thereby generating chlorine gas; and
   a cell controller for said electrolytic cell, detecting ammonia level in said aqueous stream and varying flow rate through the electrolytic cell, wherein said cell controller varies flow rate through the electrolytic cell inversely to detected changes in ammonia level in the aqueous stream.

6. The recirculating aquaculture system of claim 2, wherein said mechanical filter comprises a filter media chosen from micro screen filter media, disc filter media, and granular media.

7. The recirculating aquaculture system of claim 1, wherein said bacteria control loop comprises:
   a bacteria suppression chamber operating a bacteria suppressing means; and
   a bacteria suppression controller adjusting operation of said bacteria suppressing means at said bacteria suppression chamber.

8. The recirculating aquaculture system of claim 7, wherein said bacteria suppression controller further comprises:

means for measuring a water quality parameter and adjusting operation of said bacteria suppressing means in response thereto; and said bacteria suppressing means is selected from an ozone generator, an ultraviolet lamp, and an electrolytic processing chamber.

9. The recirculating aquaculture system of claim 1, wherein said solids control loop comprises:
a solids controller communicating with an solids image processor providing visual analysis of the aquatic stream; and
a solids filter;
wherein said solids controller and solids image processor determines turbidity of the aquatic stream and regulates flow through said solids filter in response thereto.

10. The recirculating aquaculture system of claim 9, wherein:
said solids filter is a mechanical filter selected from a drum filter, a cartridge filter, and a foam fractionator.

11. The recirculating aquaculture system of claim 1, wherein:
said feeding control loop comprises a monitor, selected from an audible behavior monitor and a visual population monitor, applied to said aqueous stream to monitor said aqueous species.

12. The recirculating aquaculture system of claim 11, wherein said selected monitor is an audible behavior monitor, comprising:
a feeding controller having a hydrophone monitoring the sound behavior of said aquatic species during feeding, thereby indicating a feeding need from sound;
and wherein said recirculating aquaculture system further comprises:
a feed dispenser responsive to said feeding controller to distribute feed as the aquatic species behavior indicates.

13. The recirculating aquaculture system of claim 11, wherein said selected monitor is a visual population monitor, comprising:
a feeding controller having an image processor providing a visual indication of population size, enabling determination of corresponding weight, thereby indicating feeding need; and
wherein said recirculating aquaculture system further comprises:
a feed dispenser responsive to said feeding controller to distribute feed as the aquatic species population size and weight indicates.

14. A method for treating captive aquatic species in a recirculating aquaculture system to control excessive accumulation of ammonia, bacteria, and solids within the system, comprising:
providing a closed, water-based habitat containing a selected aquatic species;
treating an aqueous stream that recirculates with respect to said habitat in a plurality of functional control loops operating in parallel;
wherein the control loops comprise:
an ammonia control loop initially treating the aqueous stream by generating chlorine to convert ammonia into chloramine compounds and produce free chlorine, the ammonia control loop further treating the aqueous stream by removing chloramine compounds and free chlorine;
a bacteria control loop applying a bacteria suppressing means to the aqueous stream within a bacteria suppression chamber;

a solids control loop determining turbidity of the aqueous stream and regulating flow of the aqueous stream through a solids filter in response to the degree of determined turbidity; and
a feeding control loop monitoring the aqueous species by means selected from an audible and a visual monitor, determining feeding needs from the selected monitor, and dispensing feed in responsive to the determined need.

15. The method of claim 14, wherein said step of generating chlorine comprises:
providing an electrolytic cell containing at least a set of reaction plates generating chlorine gas in response to a current applied between plates of the set, wherein the electrolytic cell applies a current between plates of the set, thereby generating chlorine gas to the aqueous stream; and
providing a cell controller for said electrolytic cell, detecting ammonia level in the aqueous stream and varying parameters of operation for the electrolytic cell in response to detected ammonia level, wherein the operating parameters are selected from voltage and current.

16. The method of claim 14, wherein said step of generating chlorine comprises:
providing an electrolytic cell containing at least a set of reaction plates generating chlorine gas in response to a current applied between plates of the set, wherein the electrolytic cell applies a current between plates of the set, thereby generating chlorine gas to the aqueous stream; and
providing a cell controller for said electrolytic cell, detecting ammonia level in the aqueous stream and varying flow rate through the electrolytic cell in response to detected ammonia level.

17. The method of claim 14, wherein said step of applying a bacteria suppressing means to the aqueous stream within a bacteria suppression chamber comprises:
providing bacteria suppression chamber that is an operating electrolytic processing chamber; and
treating the aqueous stream to suppress bacteria by flowing it through the electrolytic processing chamber.

18. The method of claim 14, wherein:
the selected means for monitoring the aqueous species is an audible behavior monitor;
further comprising:
monitoring audible behavior of the aquatic species during feeding; and
dispensing feed in a quantity responsive to the audible behavior.

19. A recirculating aquaculture system for treating an aqueous stream supporting a contained aquatic species, comprising:
a containment providing habitat for the contained aquatic species;
a plurality of functional control loops operating in parallel and communicating with said containment to recirculate and treat an aqueous stream;
wherein said control loops include a feeding control loop comprising a monitor, selected from an audible behavior monitor and a visual population monitor, applied to said aqueous stream to monitor said aqueous species.

20. The recirculating aquaculture system of claim 19, wherein said selected monitor of said feeding control loop is an audible behavior monitor, comprising:
a feeding controller having a hydrophone monitoring the sound behavior of said aquatic species during feeding, thereby indicating a feeding need from sound;

and wherein said recirculating aquaculture system further comprises:

a feed dispenser responsive to said feeding controller to distribute feed as the aquatic species behavior indicates.

21. The recirculating aquaculture system of claim 19, wherein said selected monitor of said feeding control loop is a visual population monitor, comprising:

a feeding controller having an image processor providing a visual indication of population size, enabling determination of corresponding weight, thereby indicating a feeding need;

and wherein said recirculating aquaculture system further comprises:

a feed dispenser responsive to said feeding controller to distribute feed as the aquatic species population size and weight indicates.

22. The recirculating aquaculture system of claim 19, wherein said control loops further include a bacteria control loop, comprising:

a bacteria suppression chamber operating a bacteria suppressing means; and a bacteria suppression controller for measuring a water quality parameter and adjusting operation of said bacteria suppressing means in response thereto.

23. The recirculating aquaculture system of claim 19, wherein said control loops include a solids control loop, comprising:

a solids controller communicating with a solids image processor, providing visual analysis of the aquatic stream; and a solids filter;

wherein said solids controller and solids image processor determine turbidity of the aquatic stream and regulate flow through said solids filter in response thereto.

* * * * *